(12) United States Patent
Solis et al.

(10) Patent No.: US 7,725,756 B2
(45) Date of Patent: May 25, 2010

(54) METHOD FOR GENERATING PROGRAMMABLE DATA RATE FROM A SINGLE CLOCK

(75) Inventors: Javier Solis, Sunnyvale, CA (US);
Xuduan Lin, Newark, CA (US);
Michael Field, Redwood City, CA (US)

(73) Assignee: GoBack TV, Inc., Menlo Park, CA (US)

( * ) Notice: Subject to any disclaimer, the term of this patent is extended or adjusted under 35 U.S.C. 154(b) by 771 days.

(21) Appl. No.: 11/649,740

(22) Filed: Jan. 4, 2007

(65) Prior Publication Data

US 2008/0091967 A1    Apr. 17, 2008

Related U.S. Application Data

(60) Provisional application No. 60/851,944, filed on Oct. 16, 2006.

(51) Int. Cl.
*G06F 1/06* (2006.01)

(52) U.S. Cl. .................. 713/501; 713/502; 713/600; 326/96; 327/291

(58) Field of Classification Search ............... 713/501, 713/502, 600; 326/96; 327/291
See application file for complete search history.

(56) References Cited

U.S. PATENT DOCUMENTS

| 5,903,745 | A  | * | 5/1999 | Nakayama et al. | ......... 713/500 |
| 6,448,757 | B2 | * | 9/2002 | Hill | ......................... 324/76.82 |
| 6,993,104 | B2 | * | 1/2006 | Morgan et al. | ............. 375/355 |
| 7,571,338 | B2 | * | 8/2009 | Osterling et al. | ........... 713/500 |

* cited by examiner

*Primary Examiner*—Thuan N Du
(74) *Attorney, Agent, or Firm*—Ernest J. Beffel, Jr.; Haynes Beffel & Wolfeld LLP

(57) ABSTRACT

A method for generating a wide range of clock rates from a single clock. A delta is generated from a first clock signal and a second clock signal. An accumulative offset is generated from adding the delta to a previous accumulative offset for each clock period of the first clock signal. Whenever an overflow is encountered, the value of the accumulative offset is truncated. The second clock signal is interpolated between adjacent values.

16 Claims, 5 Drawing Sheets

METHOD FOR GENERATING PROGRAMMABLE DATA RATE FROM A SINGLE CLOCK

RELATED PATENT APPLICATION

This patent stems from a provisional U.S. patent application having Ser. No. 60/851,944, and filing date of Oct. 16, 2006, entitled METHOD FOR GENERATING PROGRAMMABLE DATA RATE FROM A SINGLE CLOCK, with inventors JAVIER SOLIS, XUDUAN LIN and MICHAEL FIELD. The benefit of the earlier filing date of the prior application is claimed for common subject matter.

BACKGROUND OF THE INVENTION

This patent relates to modulation of digital data, and more particularly to producing a plurality of clock signals having a wide range of clock rates from a single clock.

DESCRIPTION OF THE RELEVANT ART

In the tasks such as the modulation of digital data, the need to process and output content at different rates is often needed. For each rate of operation that is desired a unique very accurate clock frequency must be supplied in order to obtain the proper output. To implement the clock change requires that external components and even firmware needs to be removed and replaced or reloaded.

SUMMARY OF THE INVENTION

A general object of the invention is to produce a plurality of clock signals having a wide range of clock rates of operations, all from a single clock.

Another object of the invention is to provide a wide range of clock rates while avoiding costly hardware changes.

An additional object of the invention is to provide a unique, very accurate clock frequency for the plurality of clock signals.

According to the present invention, as embodied and broadly described herein, a method for generating a wide range of clock rates from a single clock, is provided. The method comprises the steps of generating a delta from a first clock signal and a second clock signal, and generating an accumulative offset from adding the delta to a previous accumulative offset for each clock period of the first clock signal. Whenever an overflow is encountered, the steps truncate the value of the accumulative offset. The steps include interpolating between adjacent values of the second clock signal.

The present invention also includes an apparatus for generating a wide range of clock rates from a single clock. The apparatus includes a processor, or equivalently, the improvement apparatus includes a data first-in first-out (FIFO) memory, a data processor, a data interpolator and a clock generator. The FIFO memory buffers digital content. The clock generator generates a delta from a first clock signal and a second clock signal, and generates an accumulative offset from adding the delta to a previous accumulative offset for each clock period of the first clock signal. The data processor truncates, when an overflow is encountered, the value of the accumulative offset. The data interpolator interpolates between values of the second clock signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
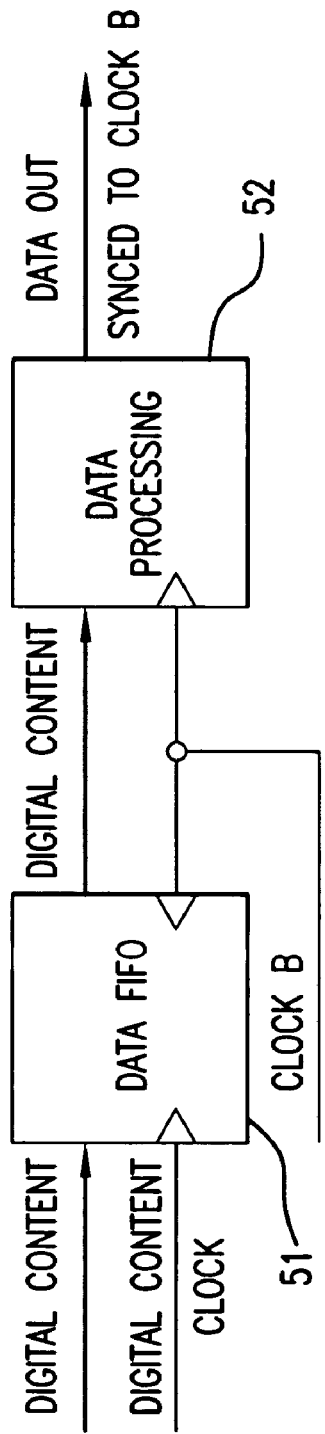
FIG. 1 shows a normal data processing unit.

Reference now is made in detail to the present preferred embodiments of the invention, examples of which are illustrated in the accompanying drawings, wherein like reference numerals indicate like elements throughout the several views.

In the tasks such as the modulation of digital data, the need to process and output content at different rates is often needed. For each rate of operation that is desired a unique very accurate clock frequency must be supplied in order to obtain the proper output. To implement the clock change requires that external components and even firmware need to be removed and replaced or reloaded. The present invention teaches how to produce a plurality of clock signals having a wide range of rates of operations, all from a single clock signal with only minimal change to code, but more importantly avoiding costly hardware changes.

The modulation of digital data over cable channels involves taking content, normally in MPEG-2 format, and putting it through a modulator which puts out a stream of symbols. The stream of symbols often are referred to as in-phase symbols (I's) and quadrature-phase symbols (Q's).

The I and Q symbols represent points in a constellation of the well-known, quadrature amplitude modulation (QAM). The size of the QAM influences the rate at which the symbols need to be supplied. Then, within each QAM, the rate itself can vary depending on the desired output rate. The normal way accommodates each rate with a very accurate crystal to generate the clock that will drive the circuits that produce the streams of symbols. Each symbol rate requires a different clock signal which requires a different crystal. This clock signal then drives the circuits that produce the processed data at the rate that is dictated by the clock frequency.

A simple representation of this way of processing can be seen in FIG. 1. Digital content are inputted to a first-in, first-out (FIFO) memory 51, at a first clock rate, CLOCK A. The digital content are then fed from the FIFO memory 51 to a data processor 52, at a second clock rate, CLOCK B. The data processor outputs data content at the second clock rate, CLOCK B.

Figure 2:
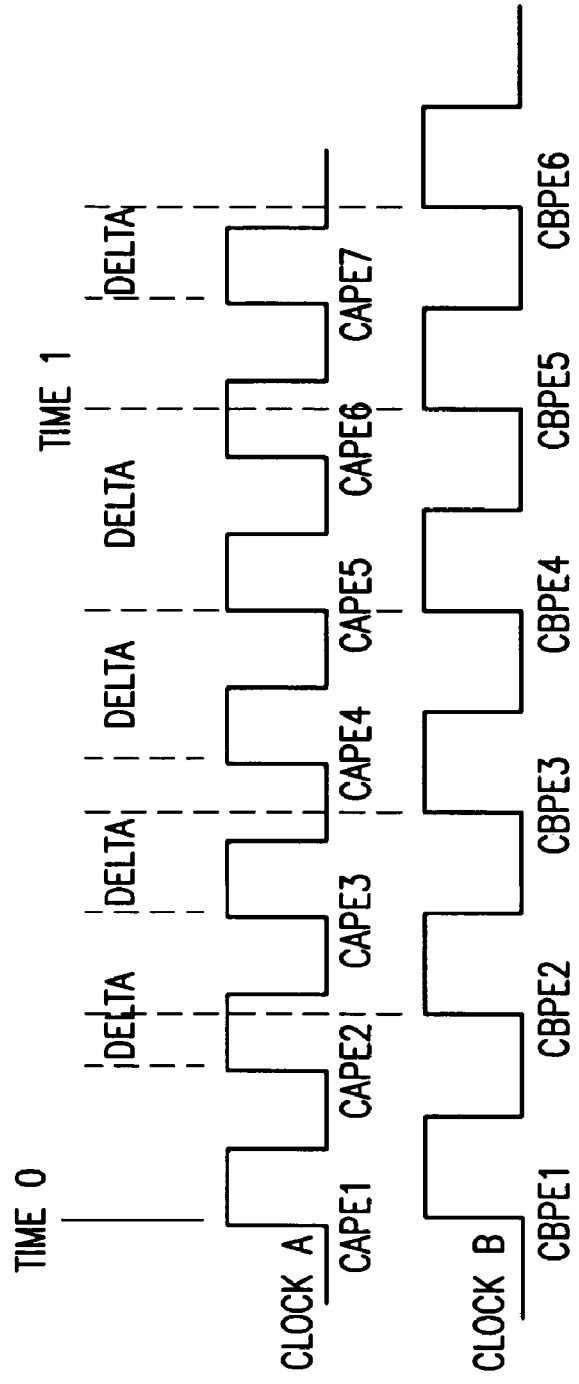
FIG. 2 shows clock A versus clock B.

As illustratively shown in FIG. 2, the present invention is taught be reference to a first clock signal, CLOCK A, and second clock signal, CLOCK B. The second clock signal, CLOCK B, is derived from the first clock signal, CLOCK A. An ordinary skilled artisan will understand that the concepts taught for deriving the second clock signal, CLOCK B, can readily be extended to a third clock signal, CLOCK C, fourth clock signal, CLOCK D, and so on, to as many clock signals are desired.

The very first item that needs to be considered in order to make this method work is the selection of the single clock frequency, which is referred to herein as the first clock signal, CLOCK A. One has to first have a range of operating frequencies that will be required, and then chose a clock frequency that is greater than the largest in that range.

Two important relationships will be applied in order to make this method work. The first is the chronological relationship between the chosen clock frequency of a first clock signal, call it CLOCK A, and the desired clock of a second clock signal, call it CLOCK B. CLOCK A and CLOCK B are needed to produce the desired symbol rate.

As shown in FIG. 2, at the starting point, TIME 0, both clocks of the first clock signal, CLOCK A, and the second clock signal, CLOCK B, are lined up with a positive edge transition on each clock signal. After one period of each, there will be a difference, delta, in the time in which the next positive edge transition takes place. This delta keeps increasing as the number of clock periods are advanced. At one point in time there will be a period of the slow clock in which 2 positive edge transitions of the faster clock signal will have been encountered. This is an important event that will continue to occur periodically. When these occur, the processing of data will be done differently, details to follow in the next relationship issue. For now, the clock relationship between the first clock signal, CLOCK A, and the second clock signal, CLOCK B, will continue to be described.

Figure 3:
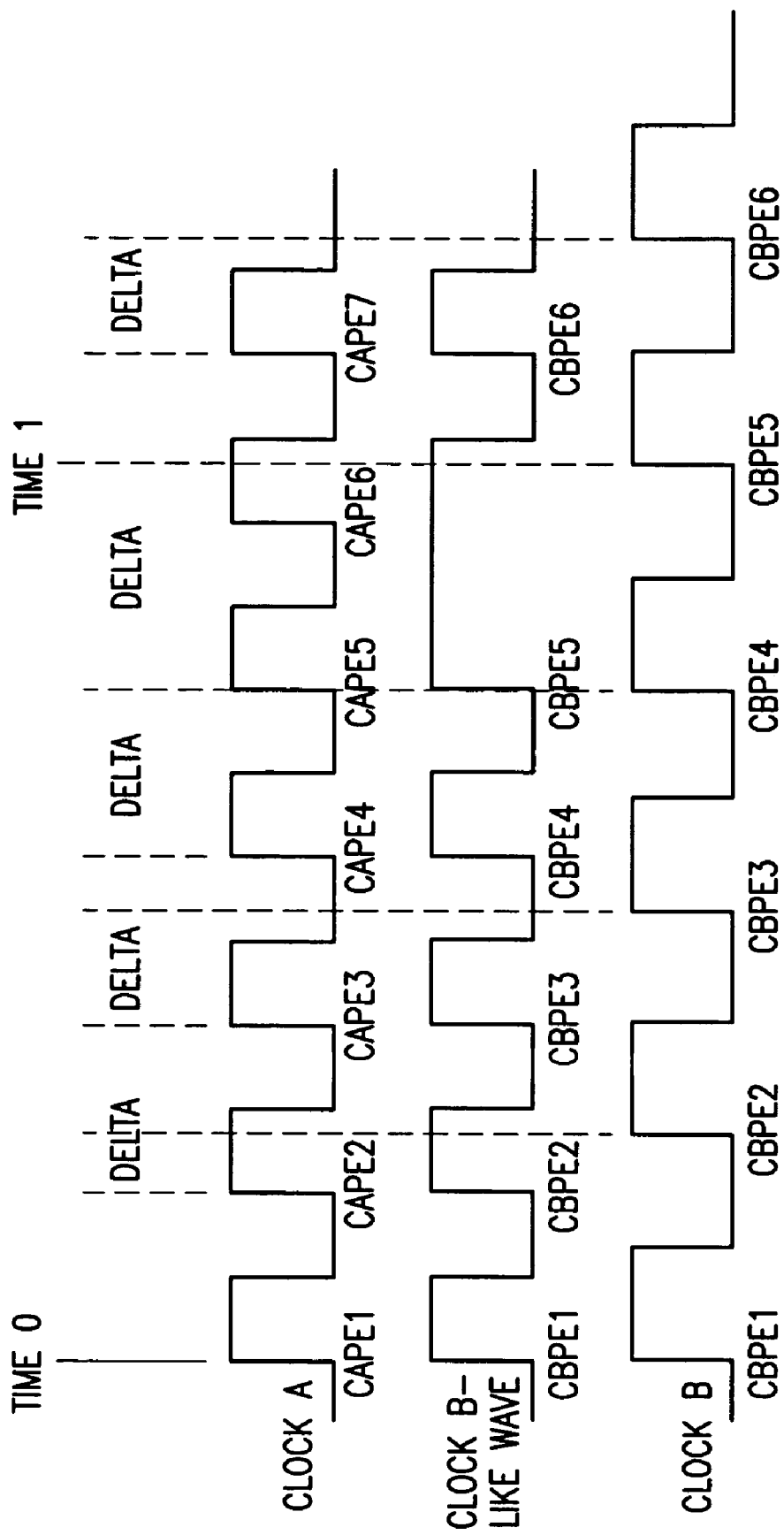
FIG. 3 shows clock B-like from clock A.

Fundamentally, the first clock signal, CLOCK A, is going to be used to create a waveform that will have the effective performance of the second clock signal, CLOCK B. To do this, consider the section of time between TIME 0 and the period in which two transitions of the first clock signal, CLOCK A, occurred in one period, TIME 1, of the second clock signal, CLOCK B. During this period of time the first clock signal, CLOCK A, as shown in FIG. 2, has six positive edge transitions marked by labels CAPE1-CAPE6. In the same period of time the second clock signal, CLOCK B, has 5 transitions marked by CBPE1-CBPE5. For the time between TIME 0 and TIME 1, there is one more positive edge transition in the first clock signal, CLOCK A, than the second clock signal, CLOCK B. To create a second clock signal, CLOCK B, like waveform using the first clock signal, CLOCK A, one of the transitions needs to be removed. The resulting waveform can be observed in FIG. 3.

The CLOCK B-LIKE-WAVE is a clock that was the same number of clock edges as the target second clock signal, CLOCK B. This odd looking clock can be used by the digital circuits that modulate digital content into symbols. The resulting rate is the same as the rate that would have been obtained by using a second clock signal, CLOCK B, in the same circuit. Most circuits use one edge of the clock or the other. If it turned out that the negative transitions of the clock are used instead of the positive, then the same derivation can be done using that edge of the clock.

To produce the value of the delta which keeps track of the relationship of first clock signal, CLOCK A, to the target second clock signal, CLOCK B, a simple ratio of the two frequencies is calculated. In this case it would be the frequency of the second clock signal, CLOCK B, divided by the frequency of the first clock signal, CLOCK A.

CLOCK B/CLOCK A

Delta can then take on the value of one minus this ratio.

DELTA=1−(CLOCK $B$/CLOCK $A$)

What delta represents is the amount of offset that has been introduced between corresponding clock edges of the two clocks as one period of the first clock signal, CLOCK A, has transpired. As time moves forward, this delta is added for each period of the first clock signal, CLOCK A. To keep track of this, an accumulator is needed such that it will continue to add the value of delta for every period of the first clock signal, CLOCK A, that has been encountered. Call this value, OFFSET.

OFFSET($n$)=OFFSET($n$−1)+DELTA

At the beginning of time the OFFSET(0) is zero since both clocks are made to start with their clock edges aligned. After a few clock cycles, the value of OFFSET will exceed one. This is an indication that there are more edges of the first clock signal, CLOCK A, than edges of the second clock signal, CLOCK B, in this period of time. This is the place in time where the CLOCK B-LIKEWAVE has its extended high state. That will suppress a clock edge to match the number of clock edges that the ideal clock would have had.

Once this overflow has been encountered, the accumulated value of OFFSET, needs to truncate the value over one in order to continue with its established equation. The only difference is that now, the term OFFSET(n−1) is 1>OFFSET($n$−1)>=0

When the next overflow is encountered the same thing must happen and so this cycle is continuously repeated.

Figure 4:
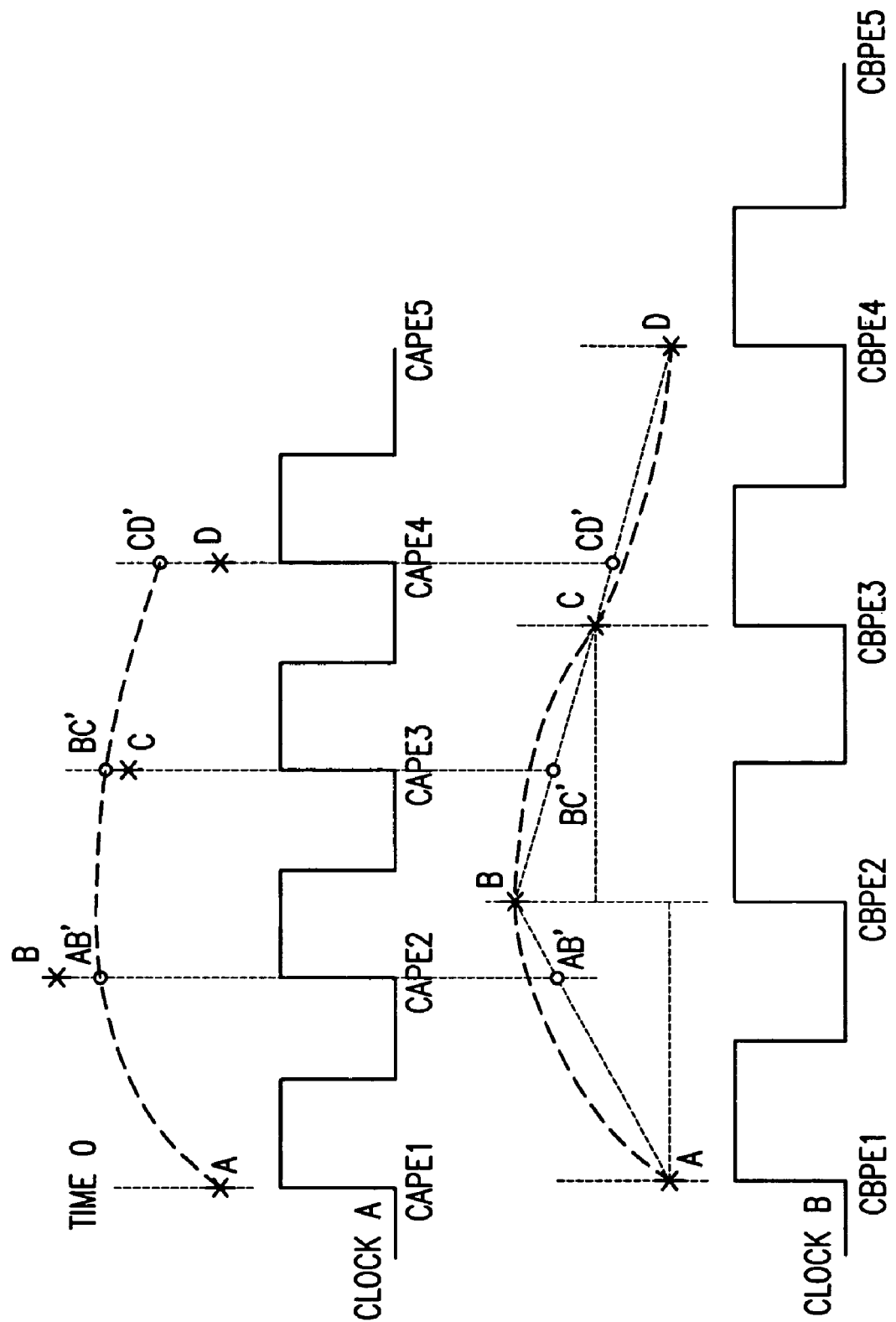
FIG. 4 shows interpolated data points.

Now, this is only half of the relationship that needs to be implemented. The glaring mismatch with the derived waveform is the time based value of the resulting symbols from the circuits using the odd clock. Essentially, the values coming out with the edges of the new clock do not line up with the place where they actually should occur. This can be seen in FIG. 3 by noting that the CBPE2-CBPE5 transitions on the CLOCK B-LIKE-WAVE do not coincide with the corresponding ones on the ideal CLOCK B waveform. To compensate this time offset of values, linear interpolation of two adjacent values needs to be done. The symbols that are being produced by the modulation and filtering send out points of data to form a smooth shaped curve. To get the closer correct values for the output of the new points in time, an interpolation between two back to back outputs will be performed, as shown in FIG. 4. The weighing of each value to the interpolated result is related to the calculations used to create the new clock, as shown in FIG. 4.

At the starting point, TIME 0, where the clock edges of the first clock signal, CLOCK A, and the second clock signal, CLOCK B, are aligned, the value of the data point at each is simple, they are the same. The next data points that correspond to the subsequent clock edges of the first clock signal, CLOCK A, will have to be interpolated by two data points that are next to each other. The next data point, B, is ideally obtained at CBPE2 of the second clock signal, CLOCK B. However, when the first clock signal, CLOCK A, is used, this data point comes out at CAPE2. To improve the shape of the data points that come out using the first clock signal, CLOCK A, in other words to make it closer to the ideal or real output, an intermediate value, AB', needs to be calculated. FIG. 4 shows a triangle between points A and B at CBPE1 and CBPE2. Projecting the time place of CAPE2 onto the line connecting points A and B, will result in a point, AB', that will be a better representation of the value of the output at CAPE2. Similarly, new data points for subsequent edges of the first clock signal, CLOCK A, will be produced. Points BC' and CD' are intermediate vale of the two data points when the edge of the first clock signal, CLOCK A, occurs. When the points are connected in each individual clock domain, the interpolated waveform follows the ideal waveform at the second clock signal, CLOCK B, much closer that if the same data points would have been used. Otherwise a time shifting compaction of the output will happen which will lead to incorrect results.

Figure 5:
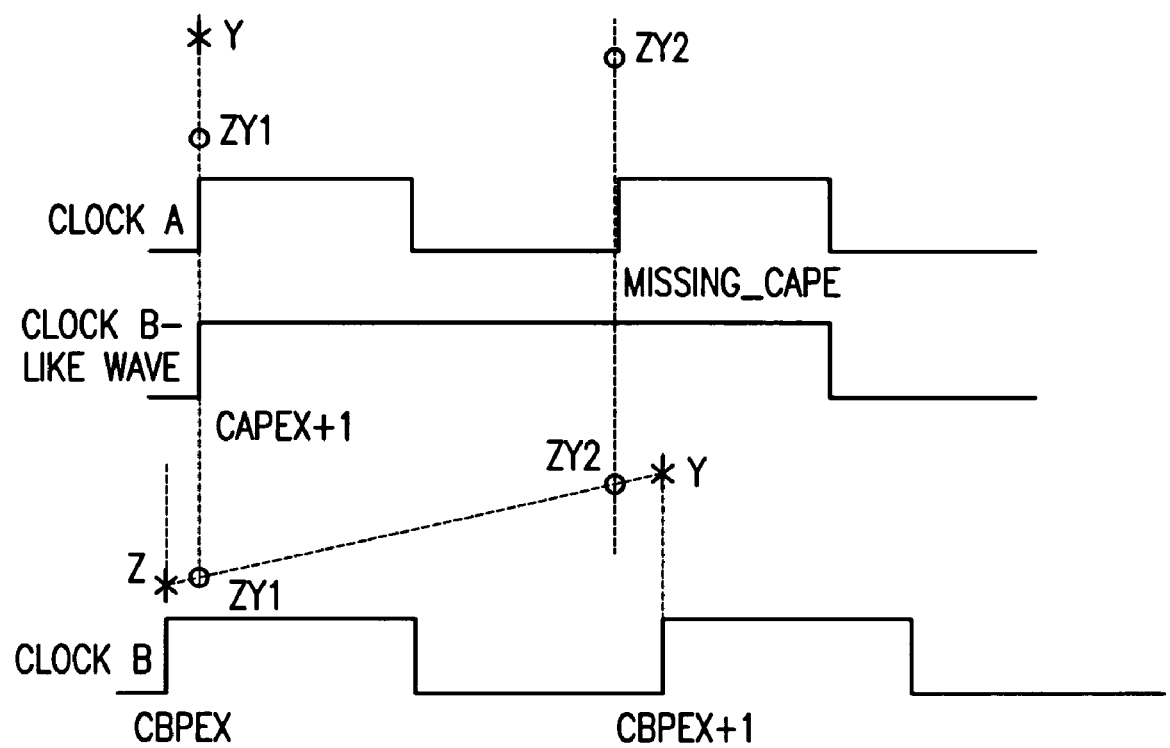
FIG. 5 shows double interpolation.

A special case that needs closer inspection is the case where two edges of the first clock signal, CLOCK A, can occur within one period of the second clock signal, CLOCK B. This will occur every so often during the normal operation of this method. In this situation there will not be any extra point of data. Two interpolated points will be forged from the two data points that at associated with this period of time. An example of this is illustrated in FIG. 5.

As time moves forward, there will spots where a double interpolation will happen. What is occurring is that the derived CLOCK B-LIKE_WAVE needs to skip a clock edge in order to match the number of clock edges of the ideal clock in a given time interval. The absence of a clock edge means that a new data point will not be introduced. Instead, the same two previous points that were used to generate ZY1 will be used to compute ZY2. The interpolation will result in a different value since the bias is now towards the second data point, Y.

The actual calculation of the interpolated values is connected to the math used to produce the OFFSET(n). This accumulating value is an indication of the placement of the current clock edge relative to the two data points being used in the interpolation. Take the case of he first interpolated value AB' in FIG. 4. The interpolated value will be a point between A and B. The amount to adjust, depending the point of reference, to one of the points will be the difference between the two points multiplied by a factor. The factor will be directly proportional to the OFFSET(n) which is always one or less than one.

$$AB' = B - (B-A) * OFFSET(n)$$

Figure 6:
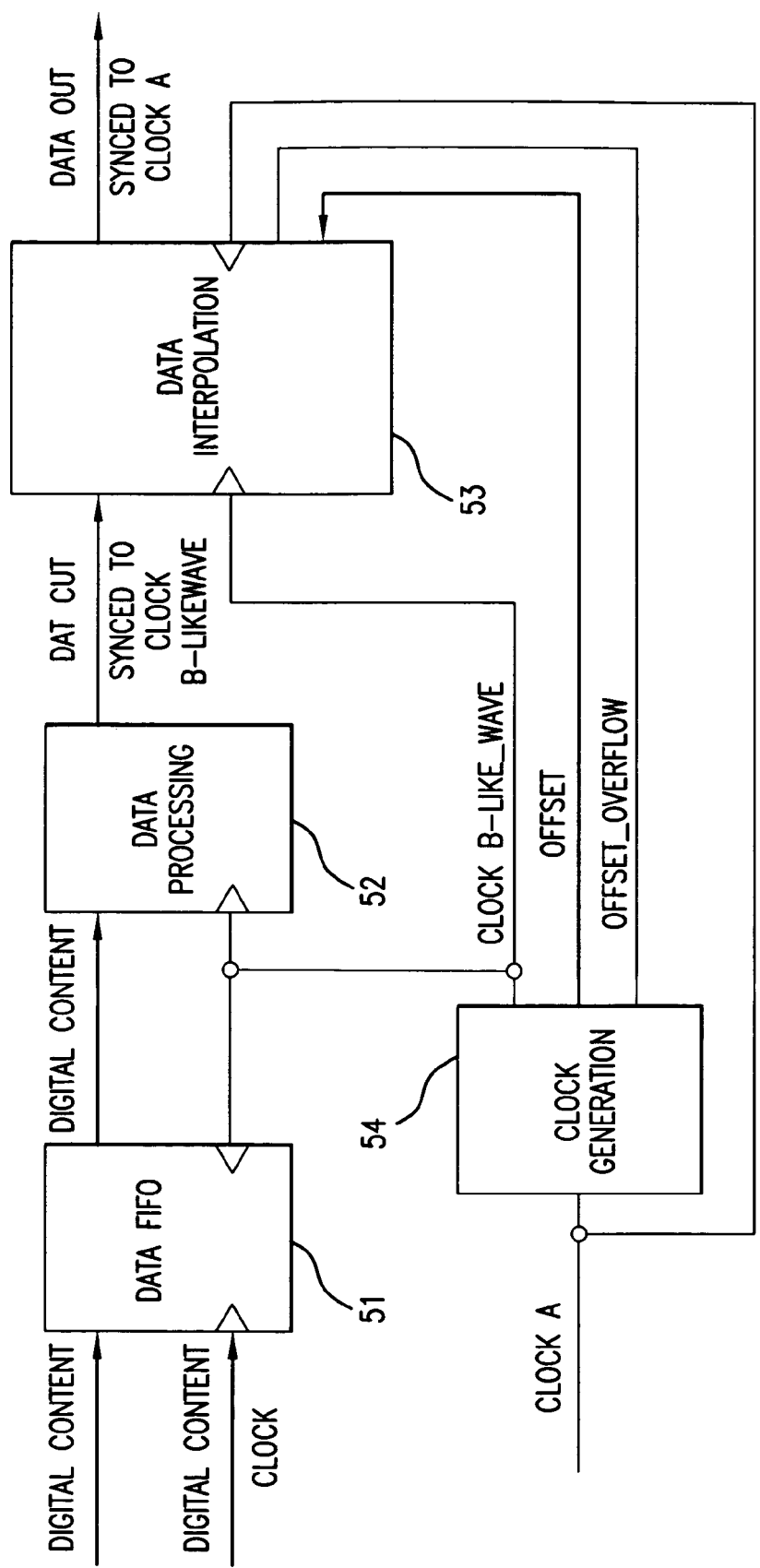
FIG. 6 is a block diagram of a programmable data rate processing unit.

By applying the clock and data interpolation principals, one can achieve an output that can have a range of data rates. To change the data rate, one only needs to change the ratio of the faster clock (CLOCK A) to the target clock (CLOCK B). The output will be synchronized to the faster clock, especially since the linear interpolation has to happen in a clock domain with all it's regularly paced clock edges. This is shown in the exemplary arrangement of FIG. 6. The clock generator 54 generates the OFFSET and OFFSET_OVERFLOW. The data interpolator 53 performs the interpolations as illustratively shown in FIGS. 4 and 5. The final output from the data interpolator 53 will be a smooth curve that is synchronized to the fast clock, CLOCK A.

It will be apparent to those skilled in the art that various modifications can be made to the method for generating a programmable data rate from a single clock of the instant invention without departing from the scope or spirit of the invention, and it is intended that the present invention cover modifications and variations of the method for generating a programmable data rate from a single clock provided they come within the scope of the appended claims and their equivalents.

We claim:

1. A method for generating a wide range of clock rates from a single clock, comprising the steps of:
   generating a delta from a first clock signal and a second clock signal;
   generating an accumulative offset from adding the delta to a previous accumulative offset for each clock period of the first clock signal;
   truncating, when an overflow is encountered, the value of the accumulative offset; and
   interpolating between values of the second clock signal.

2. The method as set forth in claim 1, with the step of generating the delta from the first clock signal and the second clock signal includes the step of generating the delta from one minus a ratio of a first clock frequency of the first clock signal and a second clock frequency of the second clock signal.

3. The method as set forth in claim 1, with the step of generating the delta from the first clock signal and the second clock signal includes the step of generating the delta from an amount of offset between corresponding clock edges of the first clock signal and the second clock signal.

4. The method as set forth in claim 1, with the step of generating the accumulative offset from adding the delta to the previous accumulative offset for each clock period of the first clock signal, including having an initial value of the accumulative offset of zero.

5. The method as set forth in claim 4, further including the step of setting the initial value of zero when clock edges of the first clock signal and the second clock signal are aligned.

6. The method as set forth in claim 1, with the step of truncating, when the overflow is encountered, including the step of truncating when the value of the accumulative offset exceeds one, thereby making the accumulative offset having a value less than one.

7. The method as set forth in claim 1, further the step of truncating, whenever an overflow is encountered, the value of the accumulative offset.

8. The method as set forth in claim 1, with the step of interpolating including the step of linearly interpolating between adjacent values of the second clock signal.

9. A apparatus for generating a wide range of clock rates from a single clock, comprising:
   a processor for generating a delta from a first clock signal and a second clock signal, and for generating an accumulative offset from adding the delta to a previous accumulative offset for each clock period of the first clock signal;
   said processor for truncating, when an overflow is encountered, the value of the accumulative offset; and for interpolating between values of the second clock signal.

10. The apparatus as set forth in claim 9, with the processor for generating the delta from one minus a ratio of a first clock frequency of the first clock signal and a second clock frequency of the second clock signal.

11. The apparatus as set forth in claim 9, with processor for generating the delta from an amount of offset between corresponding clock edges of the first clock signal and the second clock signal.

12. The apparatus as set forth in claim 9, with the processor for generating the accumulative offset from adding the delta to the previous accumulative offset for each clock period of the first clock signal, including having an initial value of the accumulative offset of zero.

13. The apparatus as set forth in claim 12, with the processor for setting the initial value of zero when clock edges of the first clock signal and the second clock signal are aligned.

14. The apparatus as set forth in claim 9, with the processor for truncating when the value of the accumulative offset exceeds one, thereby making the accumulative offset having a value less than one.

15. The apparatus as set forth in claim 9, with the processor for truncating, whenever an overflow is encountered, the value of the accumulative offset.

16. The apparatus as set forth in claim 9, with the processor for linearly interpolating between adjacent values of the second clock signal.

* * * * *